United States Patent [19]
Ogawa et al.

[11] Patent Number: 5,845,158
[45] Date of Patent: Dec. 1, 1998

[54] CAMERA HAVING A MOTION COMPENSATION DEVICE

[75] Inventors: Hidehiro Ogawa, Funabashi; Nobuhiko Terui, Ichikawa, both of Japan

[73] Assignee: Nikon Corporation, Tokyo, Japan

[21] Appl. No.: 932,362

[22] Filed: Sep. 17, 1997

Related U.S. Application Data

[63] Continuation of Ser. No. 519,936, Aug. 28, 1997, abandoned.

[30] Foreign Application Priority Data

Aug. 26, 1994 [JP] Japan .................................. 6-201613
Aug. 26, 1994 [JP] Japan .................................. 6-201834

[51] Int. Cl.[6] .............................. G03B 17/00; G03B 3/00
[52] U.S. Cl. ............................................ 396/55; 396/279
[58] Field of Search ................................ 396/52, 53, 54, 396/55, 279

[56] References Cited

U.S. PATENT DOCUMENTS

| | | | |
|---|---|---|---|
| 5,084,724 | 1/1992 | Maeno .................................... | 354/430 |
| 5,170,205 | 12/1992 | Satoh et al. ........................ | 354/195.12 |
| 5,175,580 | 12/1992 | Shiomi ...................................... | 396/55 |
| 5,335,032 | 8/1994 | Onuki et al. ............................ | 354/400 |
| 5,337,098 | 8/1994 | Imafuji et al. ............................ | 354/70 |
| 5,353,091 | 10/1994 | Ishida et al. ............................ | 354/410 |
| 5,402,197 | 3/1995 | Okano et al. ............................ | 354/410 |
| 5,416,554 | 5/1995 | Hamada et al. ......................... | 354/430 |
| 5,420,661 | 5/1995 | Hamada et al. ......................... | 354/430 |
| 5,459,542 | 10/1995 | Fujiwara et al. ......................... | 354/202 |
| 5,479,236 | 12/1995 | Tanaka .................................... | 354/430 |
| 5,485,208 | 1/1996 | Mabuchi et al. ......................... | 348/335 |

FOREIGN PATENT DOCUMENTS 2-66535   3/1990   Japan .
2-183217  7/1990   Japan .

*Primary Examiner*—Eddie C. Lee
*Assistant Examiner*—Nicholas J. Tuccillo

[57] ABSTRACT

A motion compensation camera having a camera body and a lens which is attachable to and removable from the camera body, such that the camera is able to compensate for blurring of a photographic image on an image plane resulting from motion or vibration of the camera body. The camera body has a main control unit which controls a series of camera operations. The lens either (a) determines whether it is possible to compensate for the blurring of the photographic image and transmits those results to the main control unit and controls the motion compensation operation or (b) determines whether the motion compensation operation is in progress and transmits signals which indicate this condition to the main control unit. If the lens side control unit determines that motion compensation is not possible, the main control unit controls the display unit to that effect or performs control, such as increasing the shutter speed. If the lens side control unit determines that motion compensation is in progress, the main control unit controls the display unit indicating this condition or performs controls such as setting a battery check voltage to a low level.

7 Claims, 10 Drawing Sheets

CAMERA HAVING A MOTION COMPENSATION DEVICE

This application is a continuation of application Ser. No. 08/519,936, filed Aug. 28, 1997, now abandoned.

BACKGROUND OF THE INVENTION

1. Field of the Invention

The present invention relates to a camera having a motion compensation device and, more particularly, to a camera having a motion compensation lens which is capable of compensating for the blurring of the photographic image on an image plane generated by motion or vibration incident upon an optical system of the camera.

2. Description of the Related Art

Image blur suppression devices have as their object, suppression of, or reduction of blurring in an image projected onto an image plane. A motion compensation device is a type of image blur suppression device which compensates for motion incident upon an optical system which projects the image onto the image plane. Motion is typically imparted to the optical system by way of vibrations in the optical system, or in the surrounding holding member. In general, known motion compensation devices cause a compensation lens to shift counter to the motion of the optical system so as to shift the image projected by the optical system relative to the optical system.

There have been motion compensation cameras which are able to compensate for image blurring of the photographic image on the image plane generated by motion or vibration. For example, one type of known motion compensation camera is disclosed in Japanese Laid Open Patent Publication No. HEI 2-66535 (which is for a single-lens optical system) and another type of known motion compensation camera is disclosed in Japanese Laid Open Patent Publication No. 2-183217 (which moves part of the photographic optical system of an internal focus telescopic lens).

However, in the above-noted conventional motion compensation cameras, there is a possibility that image motion compensation would be performed when some type of problem occurs in the control system for compensating for the image motion. In such a case, there is a problem in that it is not possible to achieve good photographic results.

Further, in the above-noted conventional motion compensation cameras, the power consumed by the camera increases, and battery voltage temporarily drops while the motion compensation operation is being performed. When the voltage drops considerably, there is a possibility that, for example, the necessary voltage would not be supplied to the electrical circuits of such components as a central processing unit (CPU), and it would not be possible to properly operate the camera.

SUMMARY OF THE INVENTION

Accordingly, it is an object of the present invention to provide a motion compensation camera which overcomes the above-described problems of the conventional motion compensation cameras.

It is another object of the present invention to make it possible to know the status of the motion compensation operation for a camera.

It is another object of the present invention to perform photographic control in a motion compensation camera so that photographic errors are reduced when the motion compensation operation cannot be performed.

It is still another object of the present invention to efficiently control the various functions of a motion compensation camera and to perform photography properly when the motion compensation operation is being performed.

Additional objects and advantages of the invention will be set forth in part in the description which follows and, in part, will be obvious from the description, or may be learned by practice of the invention.

Objects of the present invention are achieved by providing a camera having a camera body with a main control unit to control a plurality of camera operations for taking a photograph and a detachable lens having a motion detecting unit to detect motion of the camera body and a motion compensation optical system to compensate for blurring of a photographic image on an image plane caused by the motion, the camera comprising a determination unit to determine whether motion compensation by the motion compensation optical system is possible, and a lens side control unit, formed in the lens, to transmit the determination results from the determination unit to the main control unit and control the motion compensation of the motion compensation optical system.

Other objects of the present invention are achieved by providing a camera having a camera body and a detachable lens having a motion detecting unit to detect motion of the camera body and a motion compensation optical system to perform a motion compensation operation to compensate for blurring of a photographic image on an image plane caused by the motion, the camera comprising a main control unit, formed in the camera body, to control a plurality of camera operations for taking a photograph, and a lens side control unit, formed in the lens, to control the motion compensation of the motion compensation optical system and to transmit signals to the main control unit indicating that the motion compensation operation is in progress.

The camera body has a main control unit, which controls a series of camera operations. The lens has a determination unit, which determines whether it is possible to compensate for the blurring of the photographic image, and a lens side control unit, which transmits the determination results from the determination unit to the main control unit as it controls the motion compensation operation.

According to a first aspect of the first embodiment, the camera is equipped with a display unit, which provides a display to indicate that it is not possible to compensate for the blurring of the photographic image. The display unit receives commands from the main control unit to indicate that it is not possible to compensate for the blurring of the photographic image when the main control unit has received signals which indicate this condition. Motion compensation is not performed.

According to a second aspect of the first embodiment, the camera main control unit performs exposure control. The camera main control unit may perform exposure control by increasing the shutter speed in response to receiving signals which indicate that it is not possible to compensate for the blurring of the photographic image. Instead, the camera main control unit may cause a speedlight to be fired in response to receiving the signals which indicate that motion compensation is not possible.

Rather than the main control unit in the camera body controlling the display unit, increasing the shutter speed or firing a speedlight, the lens side control unit may be designed to perform these functions.

The camera according to a second embodiment of the present invention comprises a body and a lens which can be freely attached to and removed from the camera body and is able to compensate for motion of the photographic image resulting from vibration. The camera body has a main control unit which controls a series of camera operations, and the lens has a lens side control unit which transmits signals which indicate that the motion compensation operation is in progress to the main control unit as the lens side control unit controls the motion compensation operation.

According to a first aspect of the second embodiment, the camera is equipped with a display unit which provides a display to indicate that the motion compensation operation is in progress. The display unit is controlled by the main control unit which receives signals indicating that the motion compensation operation is in progress.

According to a second aspect of the second embodiment, the main control unit performs control to decrease the battery check voltage of the camera when the main control unit has received signals which indicate that the motion compensation operation is in progress.

According to a third aspect of the second embodiment, the main control unit interrupts the battery check operation of the camera when the main control unit has received signals indicating that the motion compensation operation is in progress.

According to a fourth aspect of the second embodiment, the camera further includes a light emitter for casting light onto the subject, such that the main control unit interrupts the charging of the light emitter when the main control unit has received signals indicating that the motion compensation operation is in progress.

In the foregoing descriptions, the main control unit in the camera body according to the second embodiment controls the display unit indicating that motion compensation is in progress, decreases the battery check voltage of the camera when the motion compensation operation is in progress, interrupts the battery check operation of the camera when the motion compensation operation is in progress or interrupts the charging of the light emitter for casting light onto the subject when the motion compensation operation is in progress. However, the lens side control unit may be designed to perform these functions instead.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
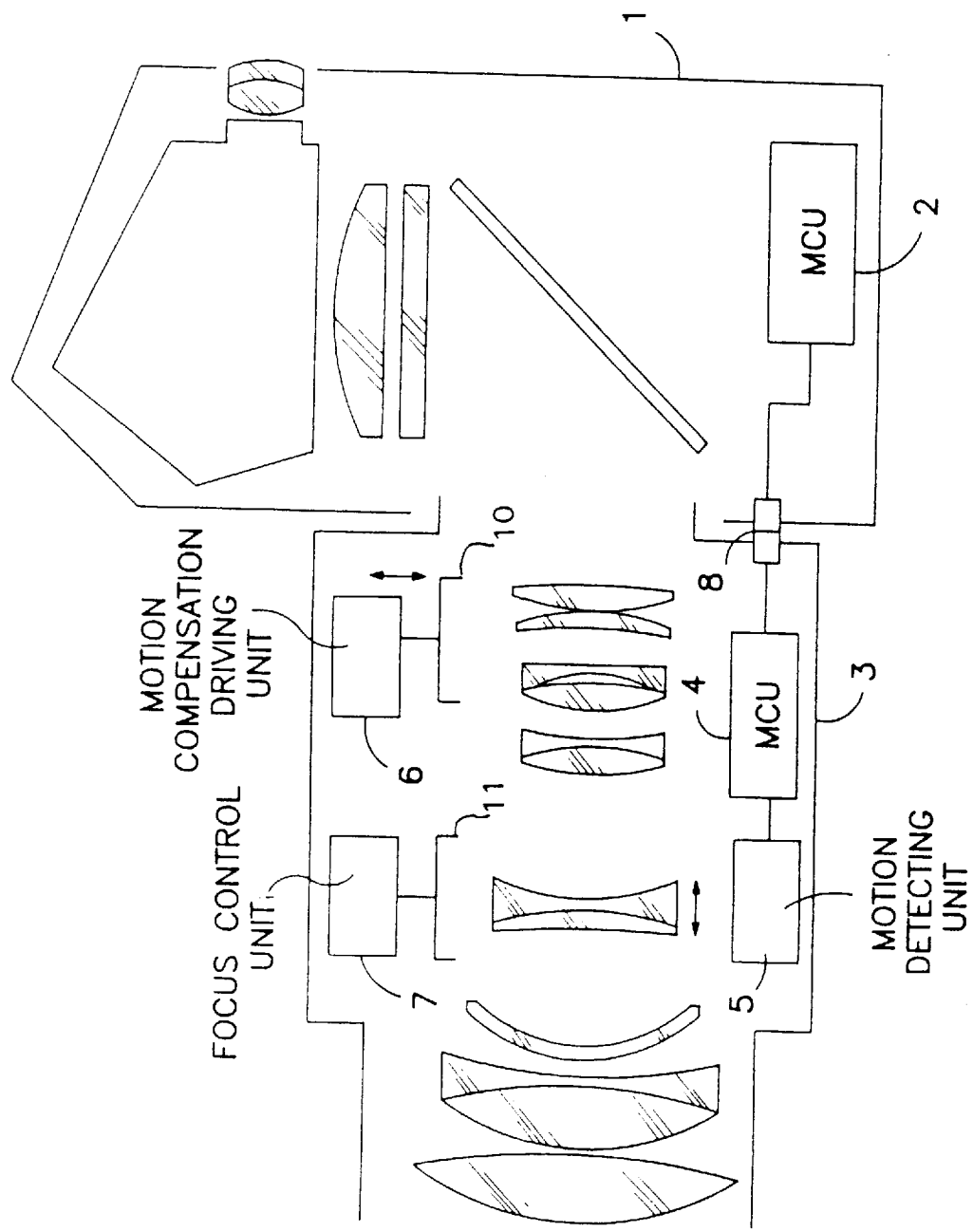
FIG. 1 is a cross-sectional diagram showing a motion compensation camera according to first and second embodiments of the present invention.

FIG. 1 is a cross-sectional diagram showing a motion compensation camera according to first and second embodiments of the present invention. The motion compensation camera includes a camera body 1, and a lens barrel 3 which can be freely attached to and removed from the camera body 1. MCU 2 and MCU 4, which are one-chip microcomputers, are attached to the camera body 1 and the lens barrel 3, respectively. The MCU 2 and MCU 4 each have electrical contacts 8, and they are electrically connected when the lens barrel 3 is attached to the camera body 1. The MCU 2 performs control of a series of camera operations, for example, the release operation, the exposure operation, and film winding. The MCU 4 performs control of communications with the camera body 1 side and control of image motion compensation.

In addition to the MCU 4, a motion detecting unit 5, a motion compensation driving unit 6 and a focus control unit 7 are attached to the inside of the lens barrel 3. The motion detecting unit 5 detects the motion incident on the camera due to such factors as hand motion. A commonly known vibration gyro angular velocity meter, for example, has conventionally been used as part of the motion detecting unit 5.

The motion compensation driving unit 6 is for shifting and driving the motion compensation optical system 10, comprising a number of lenses and which is part of the photographic optical system, in a direction which is approximately perpendicular to the optical axis. The motion compensation driving unit 6 detects the amount of shift of the motion compensation optical system 10, and has a monitor section, which transmits monitor signals to the MCU 4. The focus control unit 7 is for driving and controlling a focusing optical system 11 in the optical axis direction.

Figure 2:
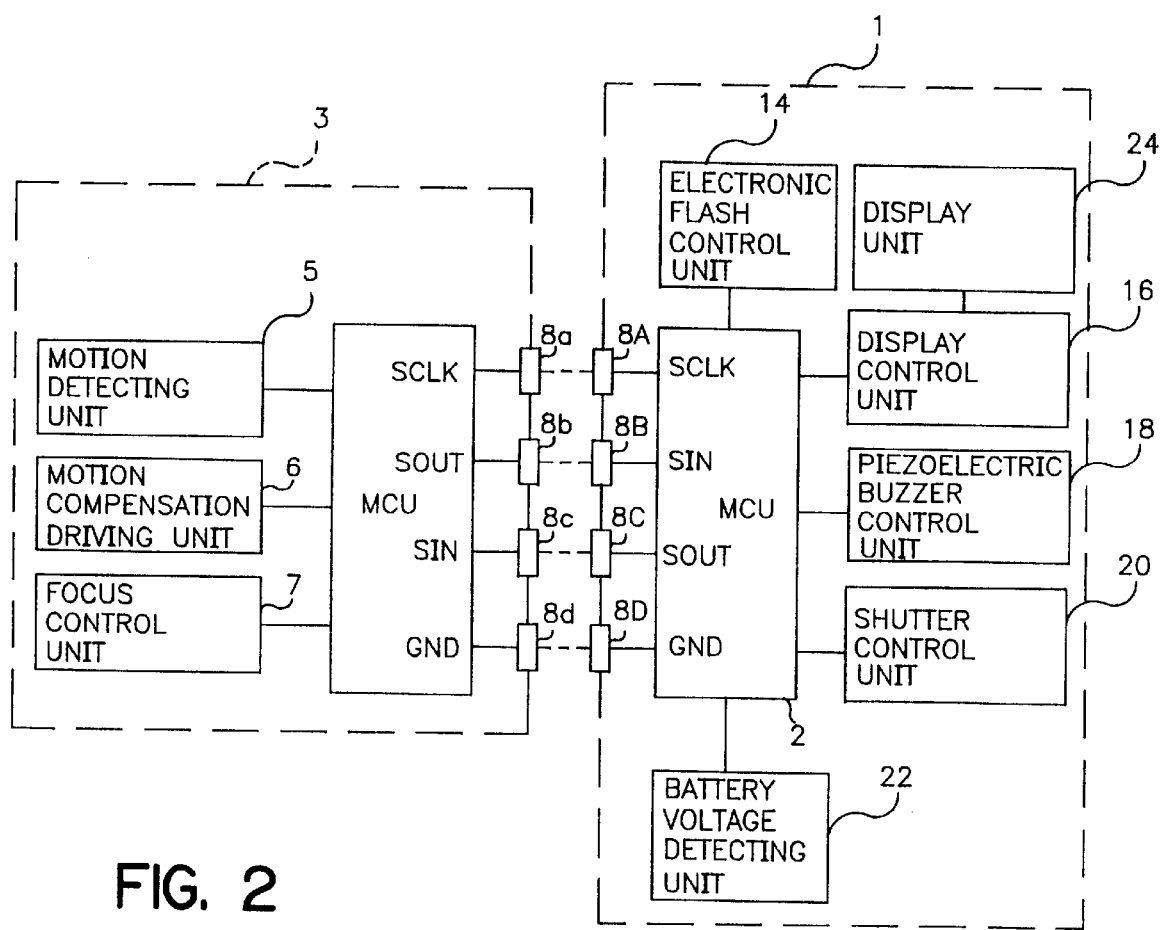
FIG. 2 is a block diagram of portions of the motion compensation camera of FIG. 1.

FIG. 2 is a block diagram of the motion compensation camera of FIG. 1. The electrical contacts 8 are configured so that clock synchronous communication is performed. Terminals 8A through 8D of the camera body 1 side are electrically connected to terminals 8a through 8d of the lens barrel 3 side, respectively.

A clock is output from terminal 8A and input to terminal 8a. The information of the lens barrel 3 side is output from the terminal 8b and input to terminal 8B. The information of the camera body 1 side is output from terminal 8C and input to terminal 8c. Terminals 8D and 8d are the camera body 1 side ground and the lens barrel 3 side ground, respectively.

An electronic flash control unit 14, display control unit 15, piezoelectric buzzer control unit 18, shutter control unit 20 and battery voltage detecting unit 22 are connected to the MCU 2. A display unit 24 is controlled by the display control unit 16. The battery voltage detecting unit 22 detects the voltage level of the battery in the camera.

Figure 3:
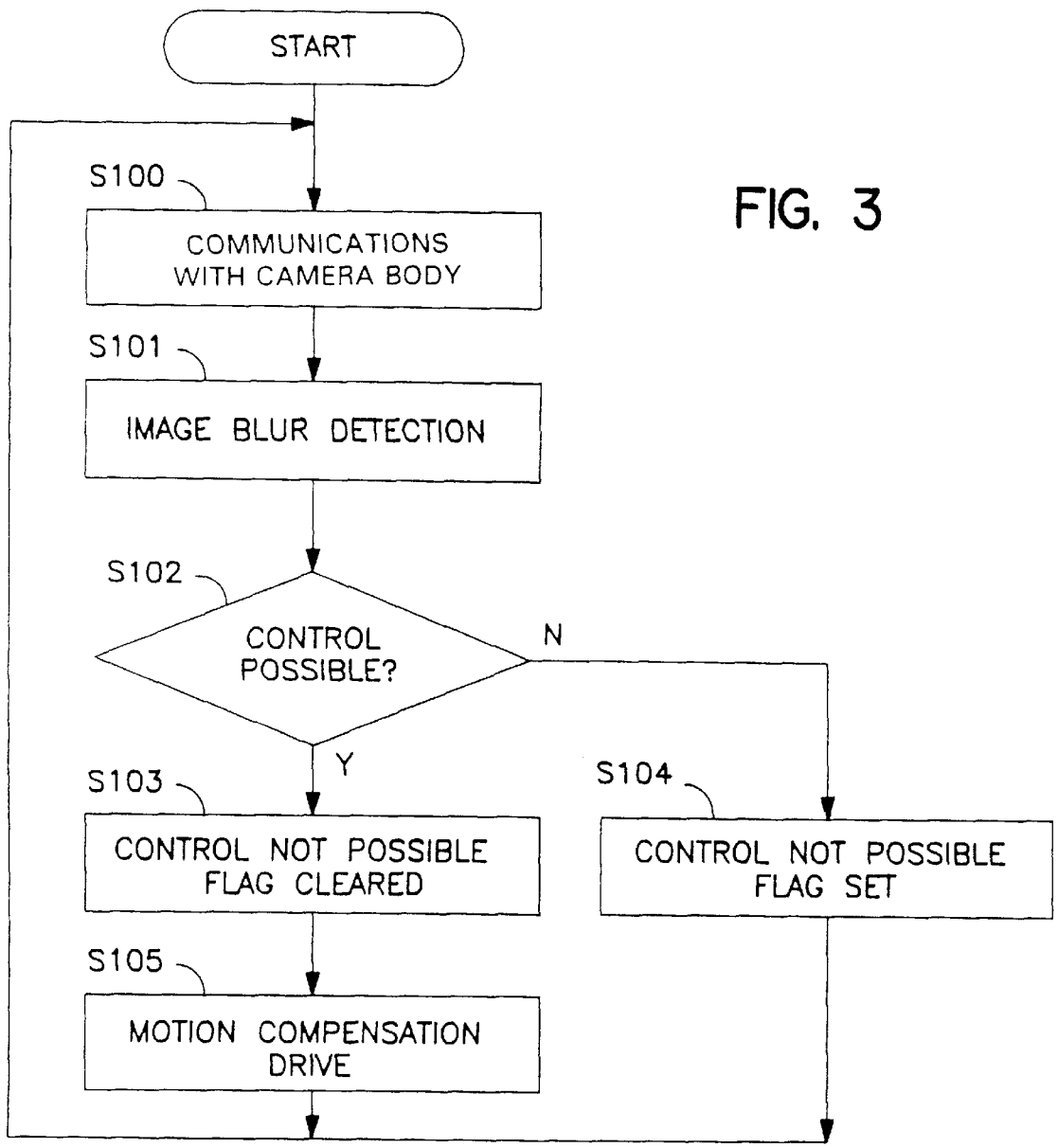
FIG. 3 is a flow chart showing motion compensation control in a microcomputer (MCU 4) in a lens of the motion compensation camera of FIG. 1 according to the first embodiment of the present invention.

FIG. 3 is a flow chart showing the motion compensation control in the MCU 4 according to the first embodiment. First, in step S100, the MCU 4 exchanges information with the MCU 2. In this step, the MCU 2 transmits lens information request commands and focusing control commands to the MCU 4. The MCU 4 transmits the lens aperture F value and focal length information to the MCU 2.

Next, in step S101, the motion detecting unit 5 detects motion incident on the optical axis of the camera. In step S102, the MCU 4 functions as a determination unit which determines whether motion compensation control by the motion compensation driving unit 6 is possible using the amount of motion detected by the motion detecting unit 5. When motion compensation control is possible, in step S103, a control not possible flag is cleared. Then, in step S105, the motion compensation driving unit 6 shifts the motion compensation optical system 10 and performs the motion compensation operation, and there is a return to step S100. On the other hand, when motion compensation control is not possible in step S102, in step S104, the control not possible flag is set, and there is a return to step S100 without the performance of the motion compensation operation. In step S100, the MCU 4 again exchanges information with the MCU 2. At this time, the MCU 4 transmits the condition of the control not possible flag designated in step 103 or step 104 to the MCU 2.

Figure 4:
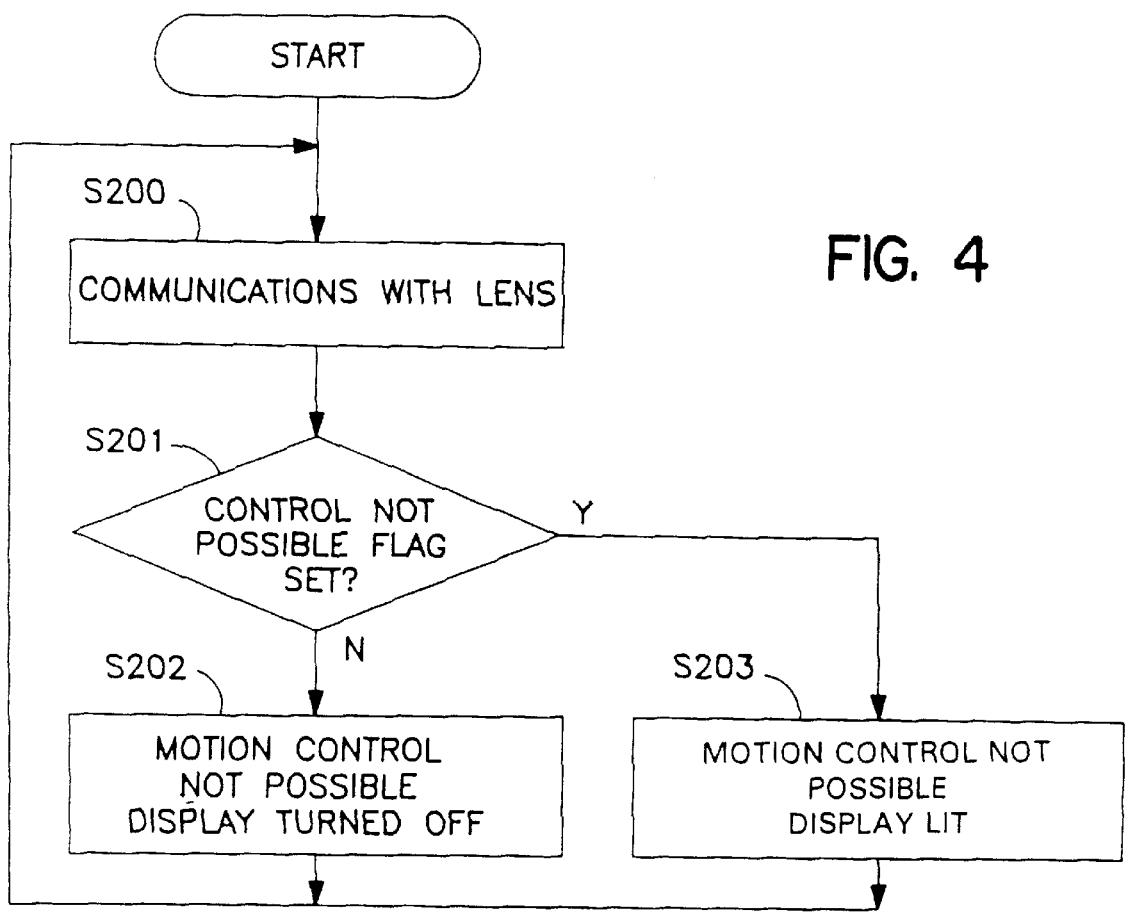
FIG. 4 is a flow chart showing motion compensation control in a microcomputer (MCU 2) in a camera body of the motion compensation camera of FIG. 1 according to a first aspect of the first embodiment of the present invention.

FIG. 4 is a flow chart showing motion compensation control in the MCU 2 according to a first aspect of the first embodiment. First, in step S200, the MCU 2 exchanges information with the MCU 4. This corresponds to step S100 in FIG. 3. Next, in step 201, the MCU 2 judges the status of the control not possible flag that has been received. When the control not possible flag is set (when the motion compensation operation is not possible), in step S203, a display lamp (display unit 24 in FIG. 2, which is for example, an LED or LCD which can be observed from inside a viewfinder of the camera) is lit by the MCU 2 via the display control unit 16 in order to indicate that the motion compensation operation is not possible. On the other hand, when the control not possible flag is not set, in step S202, the display lamp is extinguished. The photographer is able to find out whether or not the motion compensation operation is being performed by looking at the display lamp.

The motion compensation driving unit 6 feeds back drive results as it drives a motion compensation actuator, not shown in the drawings. That is, the motion compensation driving unit 6 is equipped with a detector which monitors the amount of compensation. When the motion compensation driving unit 6 drives the motor compensation actuator, and the output value of the detector does not change or changes greatly compared with what is expected, there is a judgment that an abnormality has occurred for some reason, and the MCU 4 sets the control not possible flag at these times as well.

Figure 5:
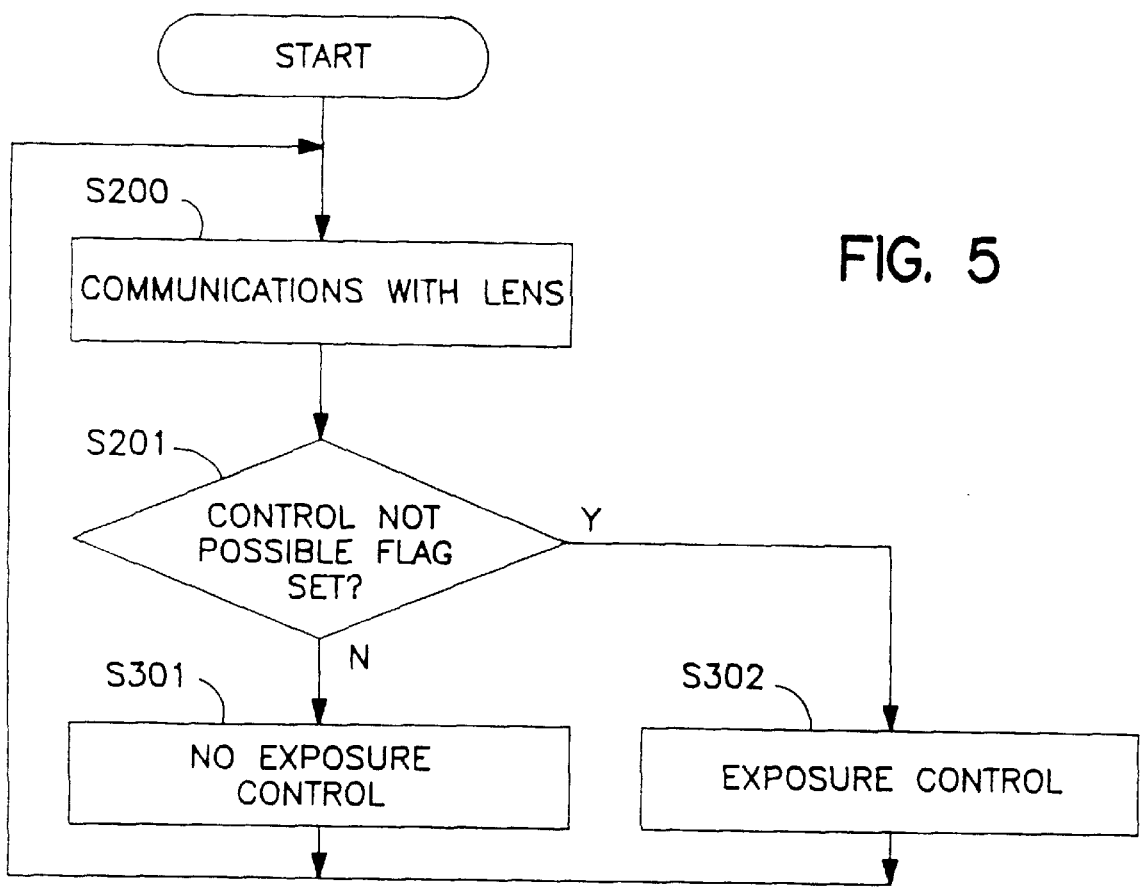
FIG. 5 is a flow chart showing motion compensation control in the MCU 2 of FIG. 1 according to a second aspect of the first embodiment of the present invention.

FIG. 5 is a flow chart which shows a second aspect of the first embodiment of motion compensation control in the MCU 2. In FIG. 5, steps S200 and S201 are the same as in FIG. 4. In step S201, when the control not possible flag is set, exposure control is performed in step S302. On the other hand, when the control not possible flag is not set, in step S301, there is a return to step S200 without performing exposure control. If exposure control is to be performed, the MCU 2 increases the shutter speed using the shutter control unit 20, for example. If control is performed in this way, even if the motion compensation operation is not performed, photography can be performed in which the effects of the motion are limited. In addition, when the shutter speed has been increased, it is desirable that control be performed so that the aperture is only opened by a corresponding amount.

Figure 6:
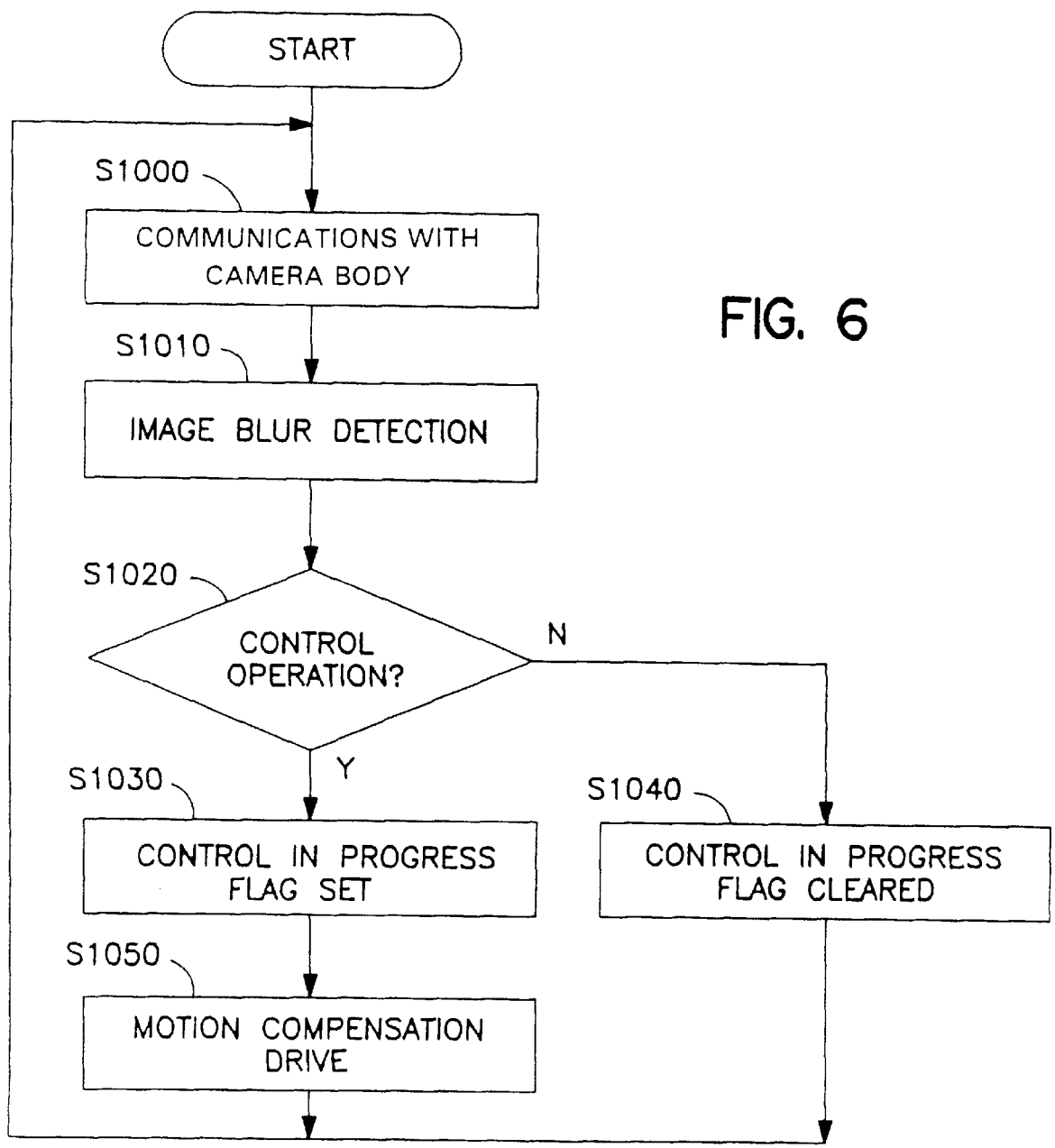
FIG. 6 is a flow chart showing motion compensation control in the MCU 4 of FIG. 1 according to a second embodiment of the present invention.

FIG. 6 is a flow chart showing the motion compensation control in the MCU 4 according to the second embodiment. First, in step S1000, MCU 4 performs exchange of information with the MCU 2. The MCU 2 transmits lens information request commands and focusing control commands to the MCU 4. Also, the MCU 4 transmits the lens aperture F value and focal length information to the MCU 2.

Next, in step S1010, the motion detecting unit 5 detects motion incident on the camera. In step S1020, the MCU 4 determines whether motion compensation control by the motion compensation driving unit 6 is necessary by using the amount of motion detected by the motion detecting unit 5. When motion compensation control is necessary, in step S1030, a control in progress flag is set in the MCU 4. Then, in step S1050, the motion compensation driving unit 6 shifts the motion compensation optical system 10 along the optical axis and performs the motion compensation operation, and there is a return to step S1000. On the other hand, when it has been determined in step S1020 that motion compensation control is not necessary, in step S1040, the control in progress flag is cleared, and there is a return to step S1000 without performing the motion compensation operation. In step S1000, the MCU 4 again performs exchange of information with the MCU 2. At this time, the MCU 4 transmits the condition of the control in progress flag designated in step S1030 or step S1040 to the MCU 2.

Figure 7:
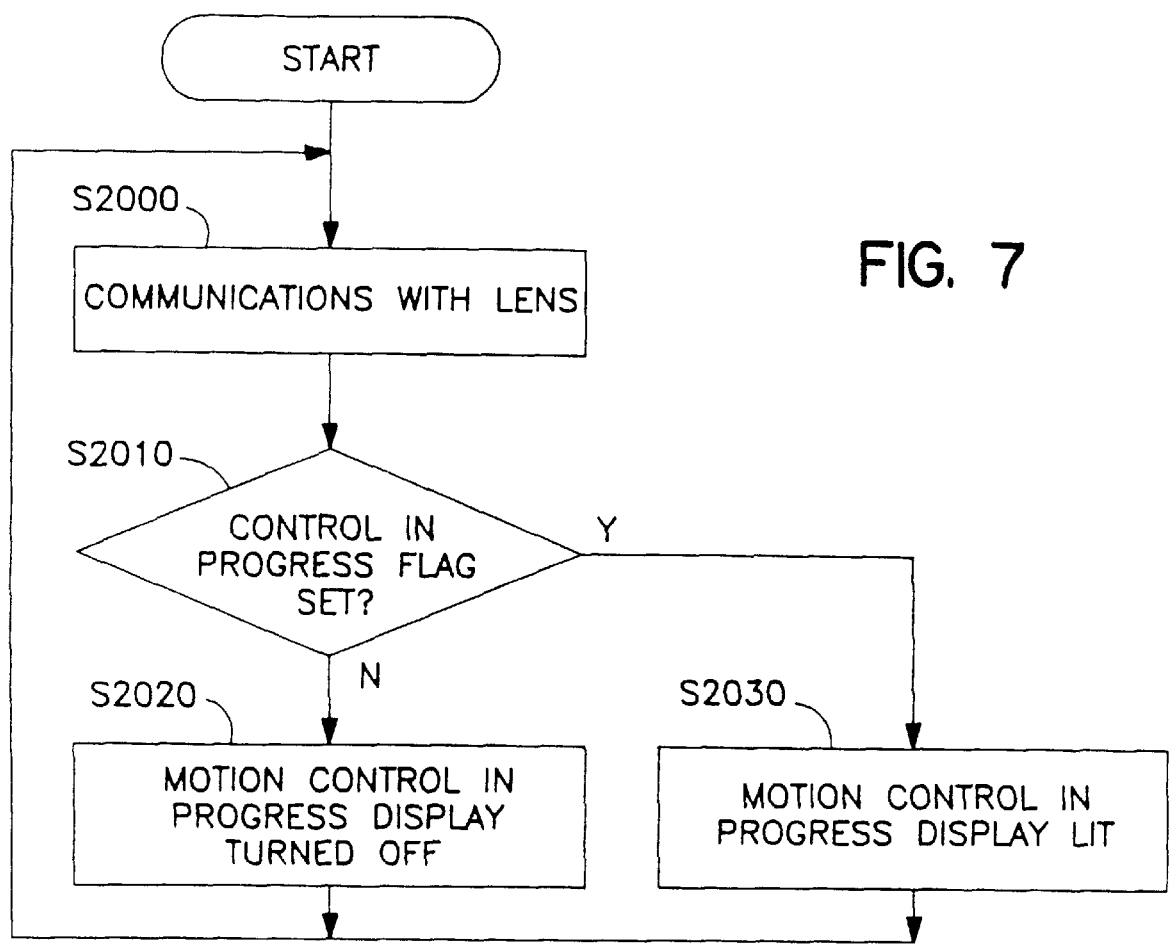
FIG. 7 is a flow chart showing motion compensation control in the MCU 2 of FIG. 1 according to a first aspect of the second embodiment of the present invention.

FIG. 7 is a flow chart showing motion compensation control in the MCU 2 according to a first aspect of the second embodiment. First, in step S2000, the MCU 2 performs exchange of information with the MCU 4. This corresponds to step S1000 in FIG. 6. Next, in step S2010, the MCU 2 judges the control in progress flag that has been received. When this control in progress flag is set (when the motion compensation operation has been performed), in step S2030, a display lamp (for example, an LED or LCD which can be observed from inside the viewfinder of the camera) is lit in order to indicate that the motion compensation operation has been performed. On the other hand, when the control in progress flag is not set, in step S2020, the display lamp is extinguished. The photographer is able to find out whether or not the motion compensation operation is being performed by looking at this display lamp. Also, the photographer is able to check whether he or she is causing hand shake.

Figure 8:
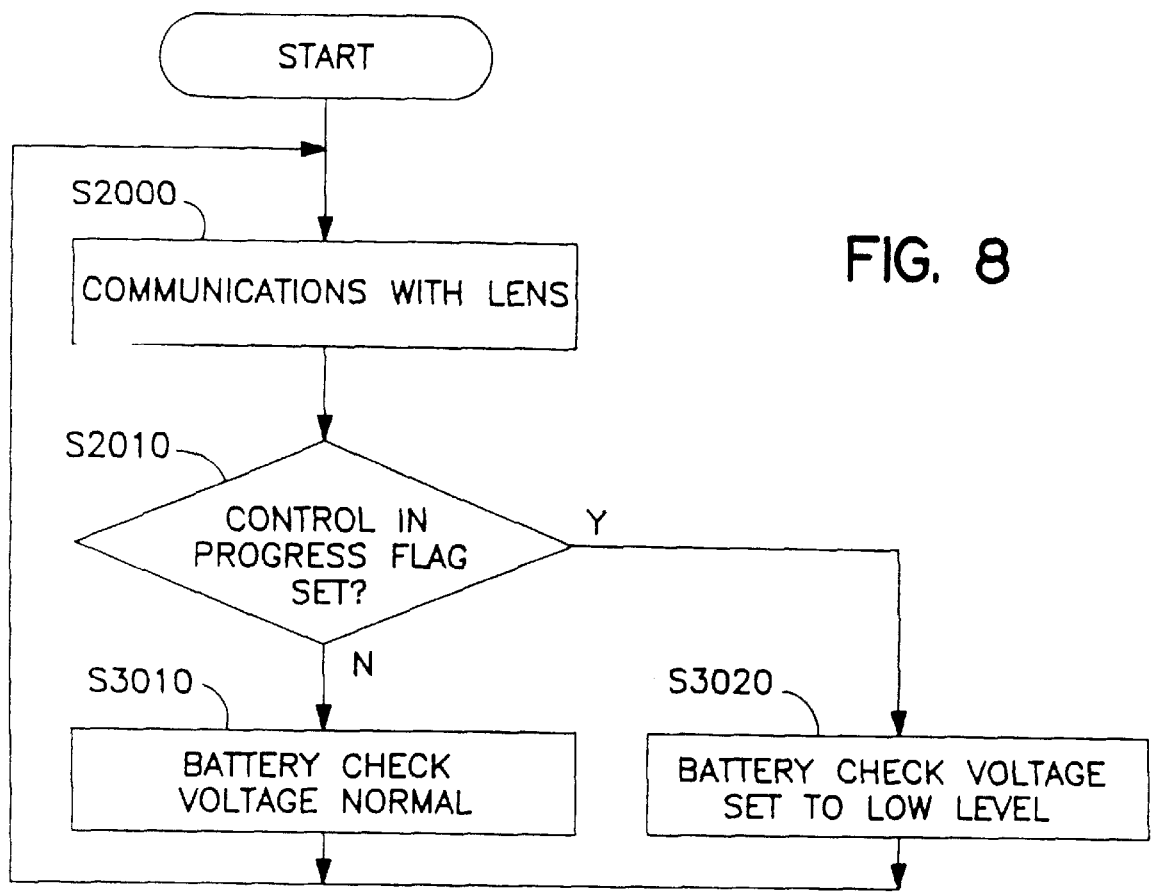
FIG. 8 is a flow chart showing the second embodiment of the motion compensation control in the MCU 2 of FIG. 1 according to a second aspect of the second embodiment of the present invention.

FIG. 8 is a flow chart showing the motion compensation control in the MCU 2 according to a second aspect of the second embodiment. First, in step S2000, the MCU 2 performs exchange of information with the MCU 4 as in the control operation of FIG. 7 In step S2010, when the control in progress flag is set, in step S3020, the MCU 2 sets a battery check voltage of the camera to a low level. On the other hand, when the control in progress flag is not set, in step S3010, the battery check voltage is set to a usual value.

Figure 9:
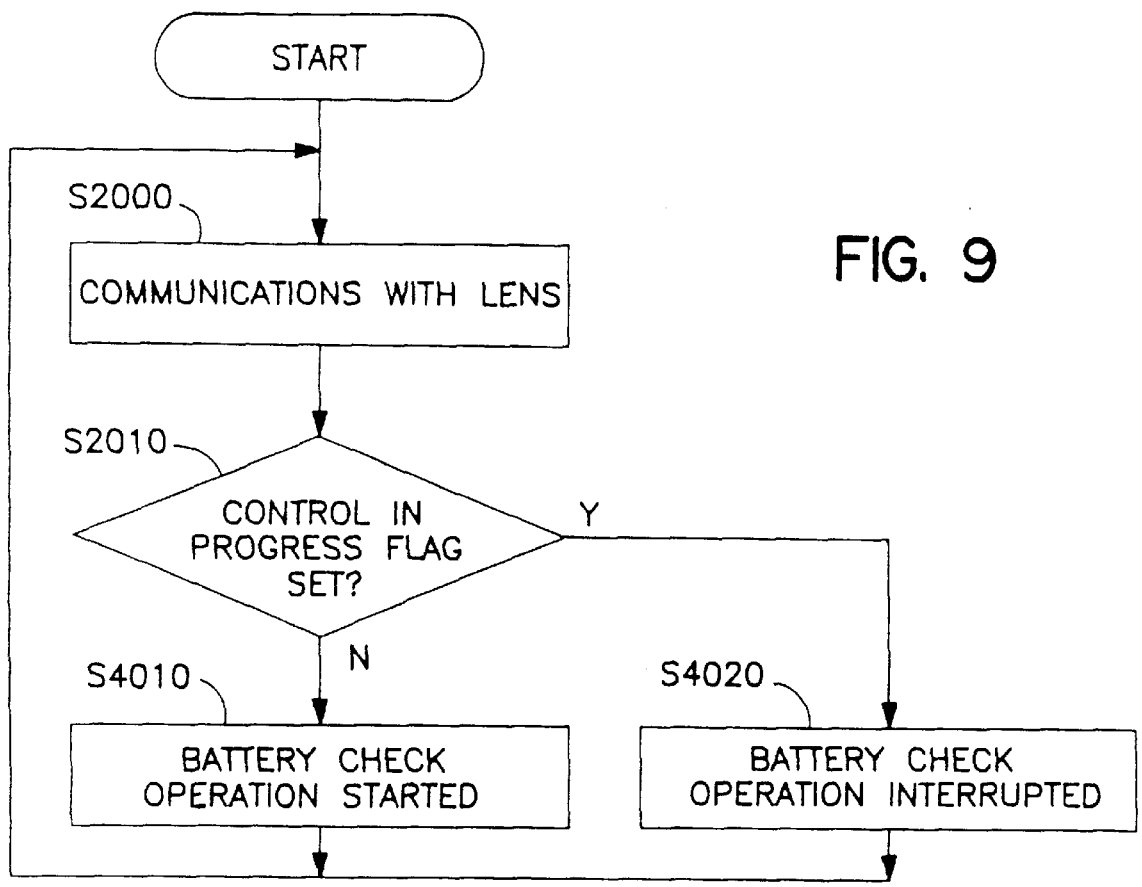
FIG. 9 is a flow chart showing the third embodiment of the motion compensation control in the MCU 2 of FIG. 1 according to a third aspect of the second embodiment.

Also, FIG. 9 is a flow chart showing the motion compensation control in the MCU 2 according to a third aspect of the second embodiment, and is a modification of the motion compensation control of FIG. 6. Step S2000 is similar to that of FIGS. 7 and 8. When the control in progress flag is set in step S2010, the MCU 2 interrupts the battery check operation in step S4020. On the other hand, when the control in progress flag is not set, the battery check operation is started in step S4010.

During the motion compensation operation, the power consumption of the camera increases and the voltage of the battery temporarily drops due to the driving of the actuator for the motion compensation optical system. When this voltage drop occurs, there is a possibility that the motion compensation operation will not be performed due to the camera's battery check operation. On the other hand, if the motion compensation operation is stopped, the battery voltage is recovered to its original amplitude.

Therefore, by performing the motion compensation control as shown in FIGS. 8 and 9 and described in the foregoing description, the motion compensation operation is not stopped due to a temporary voltage drop during the motion compensation operation.

Figure 10:
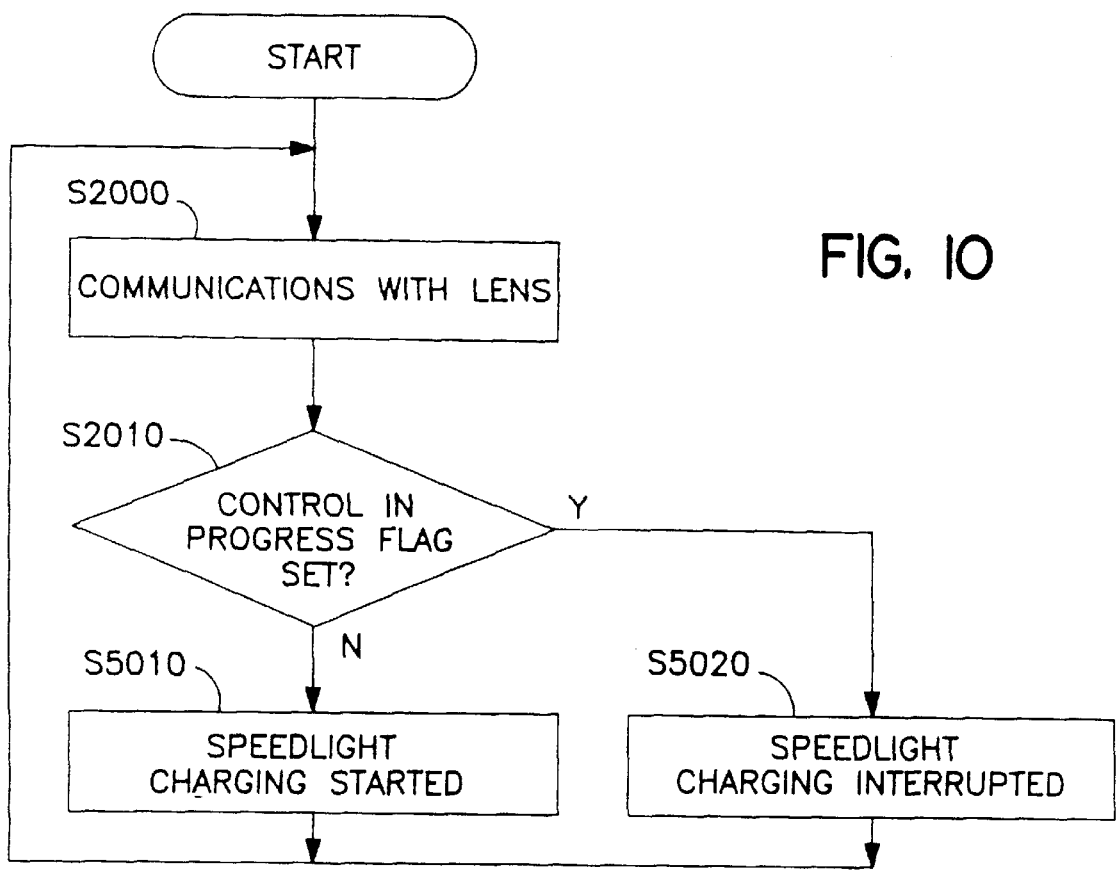
FIG. 10 is a flow chart showing the fourth embodiment of the motion compensation control in the MCU 2 of FIG. 1 according to a fourth aspect of the second embodiment.

FIG. 10 is a flow chart showing the motion compensation control in the MCU 2 according to a fourth aspect of the second embodiment, and these steps are performed in a camera having a built-in speedlight. Step S2000 is similar to that of FIGS. 7 and 9. In step S2010, when the control in progress flag is set, the process proceeds to step S5020, and the MCU 2 interrupts the charging of the speedlight. On the other hand, when the control in progress flag is not set, in step S5010, charging of the speedlight is started.

In a camera which has a built-in speedlight, when the speedlight is charging, and the motion compensation operation is in progress, the battery voltage drops considerably. In such a case, there is a possibility that the necessary power will not be supplied to the electrical circuits of such components as the MCU 2 and a drop in the speed of the motion compensation operation will occur. Therefore, by performing the motion compensation control as shown in FIG. 10 and the foregoing description, the aforementioned situation can be avoided.

Embodiments of the motion compensation camera of the present invention have been explained above, but the present invention is not limited to these embodiments, and various modifications of the above-described motion compensation camera are possible within the scope of the present invention. For example, the indication of whether motion compensation control has been performed is accomplished by the lighting or extinguishing of the display lamp. However, the present invention is not limited to this and, a piezoelectric buzzer (driven by piezoelectric buzzer control unit 18 in FIG. 2) may be used instead, for example, to indicate whether motion compensation control has been performed.

Also, as described in the foregoing, control of the camera body 1 when the motion compensation operation is not possible is performed by the MCU 2. However, control of the camera body 1 when the motion compensation operation is not possible may also be performed by the MCU 4 on the lens barrel 3 side.

Therefore, according to a first embodiment of the present invention, information on whether motion compensation is possible is transmitted to the camera body side from the camera lens side, so that the camera body side is able to give a warning or perform control to compensate for image blur on an image plane based on this information.

When motion compensation is not possible, a display indicative of this condition may be provided, so that the photographer can be warned, and photographic errors resulting from motion compensation not being performed can be avoided.

Instead of not allowing a user to take a photograph when it is determined that motion compensation is not possible, the motion compensation camera may increase the shutter speed of the camera during the taking of a photograph so that even if motion compensation is not performed, it is possible to perform photography in which the negative effects of motion are limited.

In addition to increasing the shutter speed when motion compensation is not possible, firing of a speedlight may be conducted, so that it is possible to perform photography without darkening the subject even when the shutter speed has been increased.

According to the second embodiment of the present invention, when compensation operation is in progress, signals indicative of this state are transmitted to the main control unit on the camera body side, such that when the motion compensation operation is in progress, control is performed so that the various functions of the camera are not affected, and consistent photography can be performed.

According to the first aspect of the second embodiment of the present invention, when compensation operation is in progress, a display indicating this condition is provided, so the photographer can be warned.

According to the second and third aspects of the second embodiment of the present invention, when the motion compensation operation is in progress, a battery check voltage of the battery is reduced or the battery check operation is interrupted, respectively, so that the interruption of camera operations can be prevented even if the voltage drops due to the motion compensation operation.

According to the fourth aspect of the second embodiment of the present invention, when the motion compensation operation is in progress, the charging of a light emitter in the camera is interrupted, so voltage drop factors can be reduced, and photographic operations can be consistently performed.

Although a few preferred embodiments of the present invention have been shown and described, it would be appreciated by those skilled in the art that changes may be made in this embodiment without departing from the principles and spirit of the invention, the scope of which is defined in the claims and their equivalents.

Although a few of the preferred embodiments have been shown and described, it would be appreciated by those skilled in the art that changes may be made in these embodiments without departing from the principles and spirit of the invention, the scope of which is defined in the claims and their equivalents. Further, one of ordinary skill in the art will recognize that while the preferred embodiments have been shown and described as being used within an optical camera, they may be adapted for use in any device in which it is desirable to suppress blurring of an image formed by an optical system.

What is claimed is:

1. A camera having a camera body and a detachable lens having a motion detecting unit to detect motion of the camera body and a motion compensation optical system to perform a motion compensation operation to compensate for blurring of a photographic image on an image plane caused by the motion, said camera comprising:

a main control unit, formed in the camera body, to control camera operations for taking a photograph; and a lens side control unit, formed in the lens, to control the motion compensation of the motion compensation optical system and to transmit signals to the main control unit indicating that the motion compensation operation is in progress, wherein one of said main control unit and said lens side control unit alters a battery check voltage operation of the camera in response to the motion compensation operation being in progress, and wherein said main control unit decreases a battery check voltage of the camera in response to the signals received from the lens side control unit indicating that the motion compensation operation is in progress.

2. A camera having a camera body and a detachable lens having a motion detecting unit to detect motion of the camera body and a motion compensation optical system to perform a motion compensation operation to compensate for blurring of a photographic image on an image plane caused by the motion, said camera comprising:

a main control unit, formed in the camera body, to control camera operations for taking a photograph;

a lens side control unit, formed in the lens, to control the motion compensation of the motion compensation optical system and to transmit signals to the main control unit indicating that the motion compensation operation is in progress; and a display unit, formed in the camera body, to display whether the motion compensation is in progress based upon a command from the main control unit generated in response to the received signals from said lens side control unit, wherein one of said main control unit and said lens side control unit alters a battery check voltage operation of the camera in response to the motion compensation operation being in progress, and wherein said main control unit decreases a battery check voltage of the camera in response to the signals received from the lens side control unit indicating that the motion compensation operation is in progress.

3. A camera having a camera body and a detachable lens having a motion detecting unit to detect motion of the camera body and a motion compensation optical system to perform a motion compensation operation to compensate for blurring of a photographic image on an image plane caused by the motion, said camera comprising:

a main control unit, formed in the camera body, to control camera operations for taking a photograph; and a lens side control unit, formed in the lens, to control the motion compensation of the motion compensation optical system and to transmit signals to the main control unit indicating that the motion compensation operation is in progress, wherein one of said main control unit and said lens side control unit alters a battery check voltage operation of the camera in response to the motion compensation operation being in progress, and wherein said main control unit interrupts a battery check operation of the camera in response to the signals received from the lens side control unit indicating that the motion compensation operation is in progress.

4. A camera having a camera body and a detachable lens having a motion detecting unit to detect motion of the camera body and a motion compensation optical system to perform a motion compensation operation to compensate for blurring of a photographic image on an image plane caused by the motion, said camera comprising:

a light emitter to cast light onto a subject being photographed;

a main control unit, formed in the camera body, to control camera operations for taking a photograph; and a lens side control unit, formed in the lens, to control the motion compensation of the motion compensation optical system and to transmit signals to the main control unit indicating that the motion compensation operation is in progress, wherein one of said main control unit and said lens side control unit alters a battery check voltage operation of the camera in response to the motion compensation operation being in progress, and wherein said main control unit interrupts a charging of said light emitter in response to the signals received from the lens side control unit indicating that the motion compensation operation is in progress.

5. A camera having a camera body and a detachable lens having a motion detecting unit to detect motion of the camera body and a motion compensation optical system to perform a motion compensation operation to compensate for blurring of a photographic image on an image plane caused by the motion, said camera comprising:

a main control unit, formed in the camera body, to control camera operations for taking a photograph; and a lens side control unit, formed in the lens, to control the motion compensation of the motion compensation optical system and to transmit signals to the main control unit indicating that the motion compensation operation is in progress, wherein one of said main control unit and said lens side control unit alters a battery check voltage operation of the camera in response to the motion compensation operation being in progress, and wherein lens side control unit decreases a battery check voltage of the camera in response to the motion compensation operation being in progress.

6. A camera having a camera body and a detachable lens having a motion detecting unit to detect motion of the camera body and a motion compensation optical system to perform a motion compensation operation to compensate for blurring of a photographic image on an image plane caused by the motion, said camera comprising:

a main control unit, formed in the camera body, to control camera operations for taking a photograph; and a lens side control unit, formed in the lens, to control the motion compensation of the motion compensation optical system and to transmit signals to the main control unit indicating that the motion compensation operation is in progress, wherein one of said main control unit and said lens side control unit alters a battery check voltage operation of the camera in response to the motion compensation operation being in progress, and wherein said lens side control unit interrupts a battery check operation of the camera in response to the motion compensation operation being in progress.

7. A camera having a camera body and a detachable lens having a motion detecting unit to detect motion of the camera body and a motion compensation optical system to perform a motion compensation operation to compensate for blurring of a photographic image on an image plane caused by the motion, said camera comprising:

a light emitter to cast light onto a subject being photographed;

a main control unit, formed in the camera body, to control camera operations for taking a photograph; and a lens side control unit, formed in the lens, to control the motion compensation of the motion compensation optical system and to transmit signals to the main control unit indicating that the motion compensation operation is in progress, wherein one of said main control unit and said lens side control unit alters a battery check voltage operation of the camera in response to the motion compensation operation being in progress, and wherein said lens side control unit interrupts a charging of said light emitter in response to the motion compensation operation being in progress.

* * * * *

UNITED STATES PATENT AND TRADEMARK OFFICE
CERTIFICATE OF CORRECTION

PATENT NO.: 5,845,158
DATED : December 1, 1998
INVENTOR(S): Hidehiro OGAWA, et al.

It is certified that error appears in the above-identified patent and that said Letters Patent is hereby corrected as shown below:

Title Page, and in column 1, line 5, Item [63] change "1997" to --1995--.

Signed and Sealed this

Twenty-seventh Day of April, 1999

Q. TODD DICKINSON

*Attest:*

*Attesting Officer* — Acting Commissioner of Patents and Trademarks